(12) United States Patent
Baumgart et al.

(10) Patent No.: US 8,098,450 B2
(45) Date of Patent: Jan. 17, 2012

(54) FLY-HEIGHT MANAGEMENT IN A HARD DISK DRIVE (HDD)

(75) Inventors: Peter Baumgart, San Jose, CA (US); Martin Yu-Wen Chen, San Jose, CA (US); John T. Contreras, Palo Alto, CA (US); Sujit Kirpekar, Fremont, CA (US); Bernhard E. Knigge, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/651,161

(22) Filed: Dec. 31, 2009

(65) Prior Publication Data
US 2011/0157740 A1 Jun. 30, 2011

(51) Int. Cl.
G11B 21/02 (2006.01)
G11B 15/18 (2006.01)
G11B 5/02 (2006.01)

(52) U.S. Cl. ............... 360/75; 360/25; 360/69

(58) Field of Classification Search .............. None
See application file for complete search history.

(56) References Cited

U.S. PATENT DOCUMENTS

| | | |
|---|---|---|
| 2,865,202 A | 12/1958 | Bennett |
| 4,492,997 A | 1/1985 | Arai et al. |
| 5,735,604 A | 4/1998 | Ewals et al. |
| 5,753,803 A | 5/1998 | Abraham et al. |
| 6,048,092 A | 4/2000 | Kimura et al. |
| 6,071,007 A | 6/2000 | Schaenzer et al. |
| 6,181,187 B1 * | 1/2001 | Daffron et al. ............... 327/323 |
| 6,714,006 B2 | 3/2004 | Mackay et al. |
| 7,097,110 B2 | 8/2006 | Sheperek et al. |
| 7,800,858 B1 | 9/2010 | Bajikar et al. |
| 2003/0058559 A1 | 3/2003 | Brand et al. |
| 2003/0174430 A1 | 9/2003 | Takahashi et al. |
| 2008/0225426 A1 | 9/2008 | Roy et al. |
| 2008/0247095 A1 | 10/2008 | Kim et al. |

FOREIGN PATENT DOCUMENTS

| | | |
|---|---|---|
| GB | 2012095 | 7/1979 |
| JP | 58224469 | 12/1983 |
| JP | 7260579 | 10/1995 |
| JP | 2002288953 | 10/2002 |
| JP | 2003042849 | 2/2003 |

OTHER PUBLICATIONS

Dushkes, et al., "Head Crash Detector", *IBM Technical Disclosure Bulletin*, (May 1971),3685.
Gatzen, et al., "Thermo-Resistive Flight Attitude Measurements of Flying Heads in Near-Field Magnetooptical Date Storage", *IEEE Transactions on Magnetics*, vol. 41, No. 10, (Oct. 2005),2863-2865.
Gorter, et al., "Magnetoresistive Reading of Information", *IEEE Transactions on Magnetics*, vol. 10, Issue 3, (Sep. 1974),899-902.

* cited by examiner

Primary Examiner — Daniell L Negron
Assistant Examiner — Regina N Holder

(57) ABSTRACT

A hard disk drive (HDD) including a first resistive temperature detector (RTD) configured to detect a temperature generated by proximity of a slider and a media. The first RTD is proximate an air bearing surface (ABS) of the slider. The HDD also includes a second RTD configured to detect at least one temperature correlated to a fly-height of the slider. The second RTD is not required to be proximate the ABS of the slider. HDD also includes a read/write integrated circuit (IC) configured to determine the fly-height of the slider based on detection of temperatures by the first RTD and the second RTD.

20 Claims, 4 Drawing Sheets

400

--- detect a change in resistance of a first resistive temperature detector (RTD) in response to a change of temperature of the first RTD generated by slider fly-height changes over a media, wherein the first RTD is proximate an air bearing surface (ABS) of a slider
410

↓ detect a change in resistance of a second RTD in response to a change in temperature of the second RTD, wherein the second RTD is not required to be proximate said ABS
420

↓ determine a fly-height of the slider based on the change of resistance of the first RTD and the change of resistance of the second RTD
430

FIG. 4

FLY-HEIGHT MANAGEMENT IN A HARD DISK DRIVE (HDD)

BACKGROUND

Hard disk drives (HDD) include read and write transducers that reside within a slider, which flies over a recording media/disk. Increasing demand in data density requires that the read and write transducers fly closer to the media. Accordingly, the fly-height between the slider and disk is increasingly important as storage densities also increase.

A thermal fly-height control (TFC) device (e.g., heater element) can be properly disposed within a slider to contort the slider near the read and write elements, which lowers the fly-height for the read and write transducers. To verify the relative fly-height, the read-back signal's amplitude and a Wallace spacing loss relationship can be utilized. However, the read-back signal measurement does not provide an accurate fly-height during other modes of operation other than read mode. Moreover, a single resistor can be used for temperature sensing, but a single resistor can have difficulty in differentiating between but not limited to, the effects of (1) cooling effects from fly-height differences, (2) self-heating, (3) TFC heating, and/or (4) write-head heating.

BRIEF DESCRIPTION OF THE DRAWINGS

FIG. 4 illustrates an example of a flow chart of a method for fly-height management, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
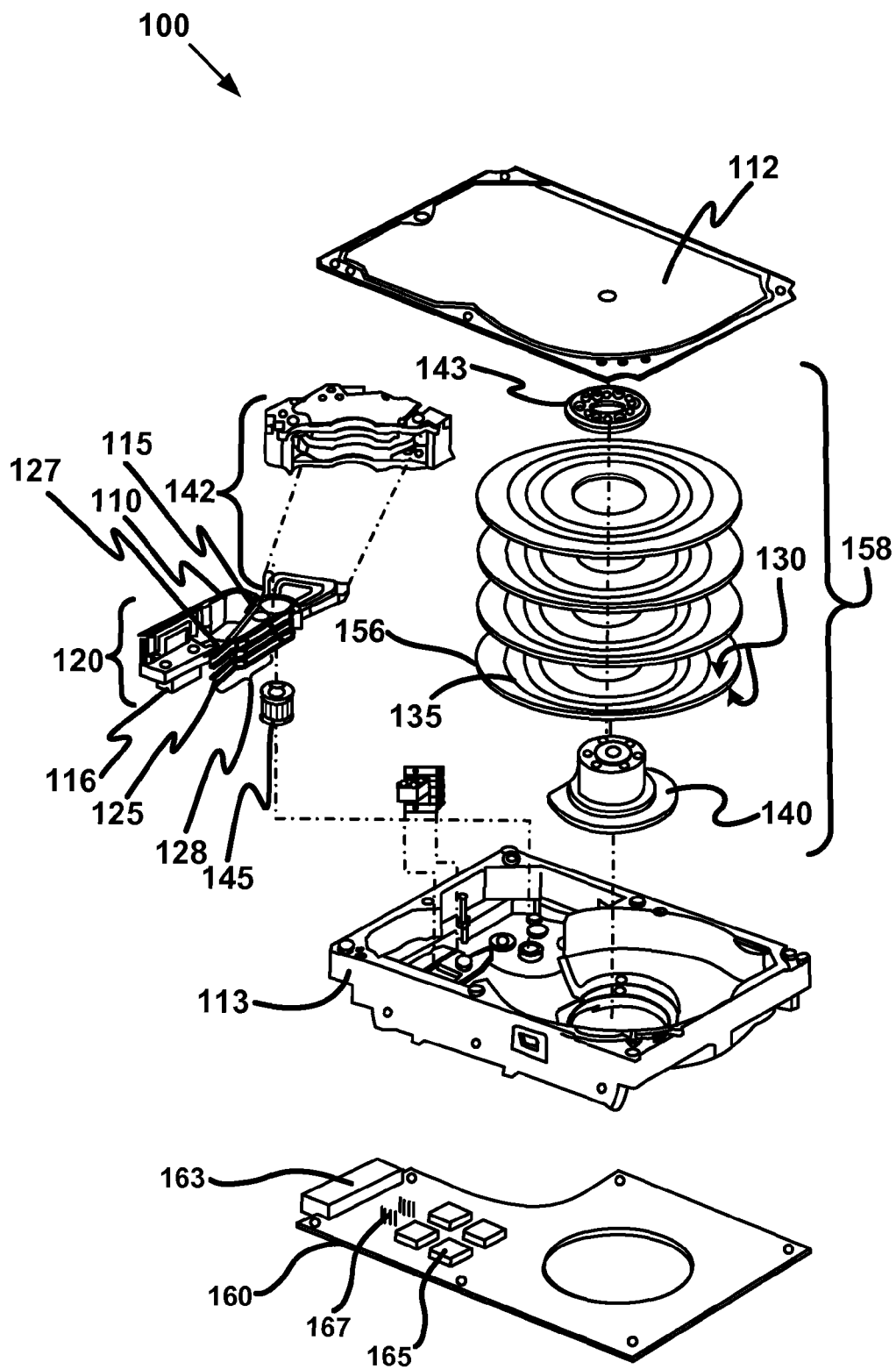
FIG. 1 illustrates an example of a HDD, in accordance with an embodiment of the present invention.

With reference to FIG. 1, an isometric blow-up view of an example hard disk drive, HDD 100, is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. In one embodiment, suspension 127 is an integrated lead suspension (ILS). Hard disk drive slider 125 includes one or more magnetic transducers or heads which read data from and write data to data tracks 135. Suspension 127 and hard disk drive slider 125 comprise the head gimbal assembly (HGA) 128. Flex cable 110, which is part of HSA 120, conveys data between HSA connector 116 and arm electronics (AE) module 115. AE module 115 controls read and write operations and, as described herein, in various embodiments includes a read-write integrated circuit (IC) (not shown). Read-write IC is coupled to slider 125 via flex cable 110 and suspension 127. In some embodiments, read-write IC is located elsewhere within HDD 100, such as on flex cable 110, within other portions of HSA 120, or on printed circuit board (PCB) 160. HSA connector 116 also conveys control data between PCB 160 and VCM 142.

HSA 120 is coupled pivotally with base casting 113 by means of pivot bearing 145, such that VCM 142 can move HGA 128 with slider 125 accurately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

The cover 112 is coupled with base casting 113, and PCB 160 is coupled to base casting 113. PCB 160 comprises electrical components 165 which in general perform the electrical signal processing for HDD 100, such as status checks for HDD 100, power control for motor-hub assembly 140, servo control of VCM 142, and other tasks related to reading data from and writing data to the disk media. The VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other physical manners and other locations, in other embodiments.

The displayed configuration of HDD 100 is shown by way of example and not of limitation. It is also appreciated that in some embodiments, one or more components of HDD 100 can be interchanged or shared between subassemblies while maintaining the spirit of the definitions of the aforementioned assemblies and subassemblies.

Figure 2:
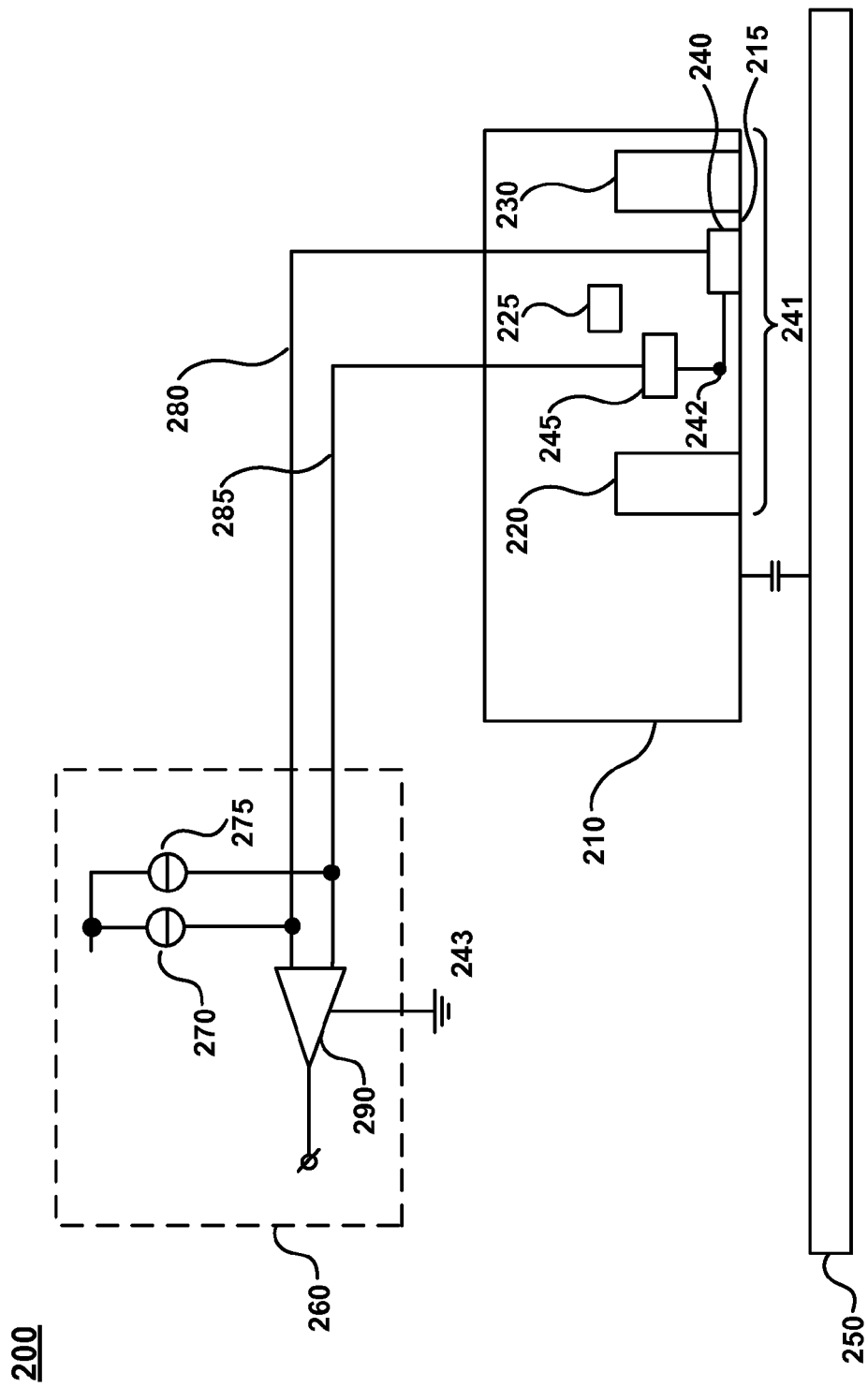
FIG. 2 illustrates an example of a HDD, in accordance with an embodiment of the present invention.

FIG. 2 illustrates a diagram of a dual-sense temperature compensated (DSTC) circuit within HDD 200, in accordance to an embodiment. HDD 200 includes a slider 210, magnetic disk 250 and read-write IC 260.

Slider 210 includes writer 230 configured to write data to magnetic disk 250, reader 220 configured to read data from magnetic disk 230, TFC 225 configured to lower the slider fly-height (as described above) and resistive temperature detector (RTD) 240 and RTD 245. In one embodiment, reader 220 is a Tunneling Magnetoresistive (TMR) element. RTD devices 240 and 245 are connected to a reference point 242, which is common to amplifier 290 and common point 243.

RTD 240 is located proximate air bear surface (ABS) 215 and writer 230 of slider 210. RTD 240 is configured to detect a temperature generated by fly-height changes and slider contacts with media 250. Fly-height changes will change RTD 240 resistance from cooling differences in the fly height, for region 241 of slider 210. In other words, RTD 240 detects fly-height changes when slider region 241 comes near (e.g., in proximity) or into physical contact with media 250. Changes in fly-height and physical contact with the media 250, changes the resistance of RTD 240. Accordingly, a voltage across RTD 240 changes. In one embodiment, real-time fly-height and contact is measured via RTD 240.

RTD 245 is configured to detect at least one temperature correlated to a fly-height of slider 210. Temperatures, such as, but not limited to, (1) self-heating, (2) TFC heating, (3) write-head heating, and (4) the temperature of the slider 210. For example, if slider 210 is subject to a temperature that correlates to a fly-height, the resistance of RTD 245 will also change. Accordingly, a voltage across RTD 245 will increase as the temperature of RTD increases. In one embodiment, real-time relative temperature compensation is measured via RTD 240 and RTD 245, which will be described in detail later. It should be appreciated that RTD 240 and RTD 245 are electrically connected with each other (e.g., connected at ground 242).

RTD 245 is not required to be disposed at ABS 215 and not required to include significant temperature effects of ABS. In one embodiment, RTD 245 is disposed away from ABS (e.g., 6 microns). It should also be appreciated that RTD 240 and RTD 245 are comprised of, but not limited to, metallic (e.g., NiFe) and semiconductor materials.

Read/write IC 260 is configured to determine the fly-height of slider 210 based on detection of temperatures by the first RTD 240 and second RTD 245. In one embodiment, determination of the fly-height based on detection of temperature by first RTD 240 and second RTD 245 is as follows. RTD 240 is connected to current source 270 and RTD 245 is connected to current source 275. Currents sources 270 and 275 are matched such that a voltage in (Vin) is 0 Volts (V), when first RTD 240 and second RTD 245 are at the same temperature. In other words, current sources 270 and 275 are matched such that voltage at 280 is equal to voltage at 285. Accordingly, when there is a temperature difference (between RTD 240 and RTD 245) the voltage difference is then measured by buffer amplifier 290. It should be appreciated that buffer 290 is configured to determine if there is a slider contact with media via RTD 240. In various embodiments, current sources 270 and 275 can be, but are not limited to a CMOS current source or bipolar current source. In addition, current sources 270 and 275, may be configured to offset any resistance differences or temperature gradient offsets due to the physical positions of RTDs 240 and 245.

It should be appreciated that configuration of RTD 240 and RTD 245 can be used to cancel external heat sources and distinguish its origin, and primarily measure temperature changes near ABS 215. In various embodiments, variations from the origin may indicate fly-height changes or disk-slider contacts, which allows lower flying heights. In one embodiment, TFC is used in conjunction with DSTC to minimize and maintain the fly height.

Figure 3:
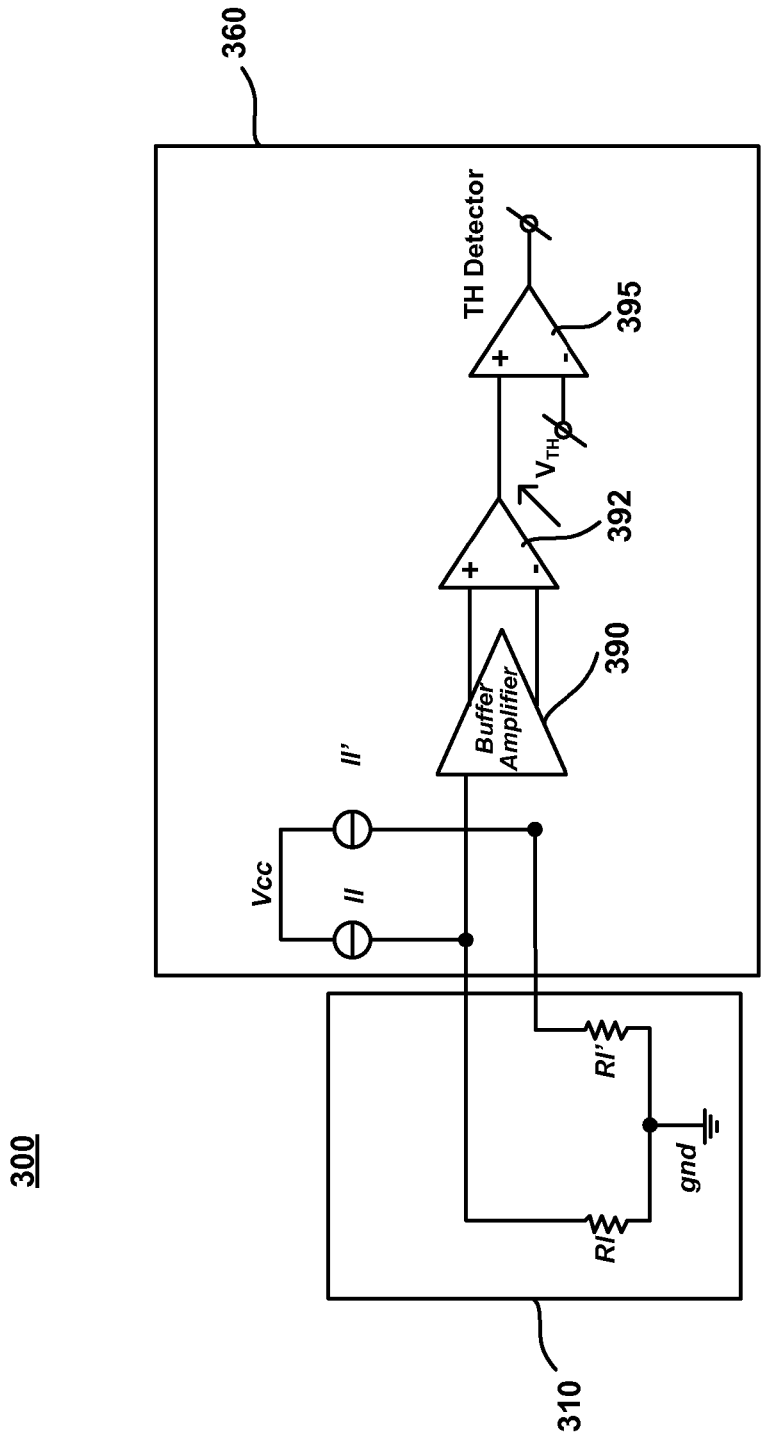
FIG. 3 illustrates an example of a dual-sense temperature compensated (DSTC) circuit architecture, in accordance with an embodiment of the present invention.

FIG. 3 illustrates circuit architecture of DSTC circuit 300, in accordance to an embodiment. DSTC circuit 300 includes resistor R1 (e.g., first RTD 240) and R1' (e.g., second RTD 245) disposed within slider 310. Current sources I1 (e.g., current source 270) and I1' (e.g., current source 275) are used to bias RTD devices R1 and R1'. In one embodiment, current sources I1 ad I1' are within read/write IC 360. Current sources I1 and I1' are substantially equivalent by layout design techniques, such as quadrature or interdigitized. Moreover, current sources I1 and I1' can have auto-zeroing. In one embodiment, calibration would include an offset adjustment to account for process variations for current sources I1 and I1', and R1 and R1'. It should be appreciated that both layout and auto-zeroing techniques are well known skills in the art of circuit design.

Read/write IC 360 includes buffers 390, 392 and threshold (TH) detector 395. Output of buffer amplifier 390 is connected to buffer 395. Output of buffer 392 is connected to TH detector 395.

TH detector 395 compares input voltage difference (e.g., from voltages 280 and 285) to a programmable reference voltage ($V_{TH}$). Accordingly, if a contact asperity occurs, TH detector 395 will signal that a disturbance has occurred at a Head-Disk Interface (HDI) between slider 310 and media (e.g., media 250).

In particular, with I1 and I1' equivalent, and R1 and R1' equivalent, the following equations are utilized to determine the temperature difference:

$$V1 = R1(1+\alpha t1)I1 \quad (1)$$

where V1 is the voltage associated with resistance, R1, current, I1, temperature, t1, and α is the temperature coefficient of resistance (TCR) for the material used for R1.

$$V2 = R1'(1+\alpha t1')I1' \quad (2)$$

where V2 is the voltage associated with resistance, R1', current I1', temperature, t1', and α is the temperature coefficient of resistance (TCR) for the material used for R1'. However, after the calibration state, R1 and R1' and I1 and I1' are equivalent as presented above. Accordingly, $$\Delta V = R1 I1(\alpha(t1-t1')) \quad (3)$$

where the ΔV is the change in voltage (between R1 and R1') in relation to t1−t1' (e.g., Δt).

FIG. 4 illustrates a flow chart of a method 400 for fly-height management in a HDD, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 400 is performed at least by a system of FIGS. 1-3.

At 410, a change in resistance of the first RTD (e.g., 240) is detected in response to a change of temperature of the first RTD generated by change in fly-height or slider contact with a media. The first RTD is located proximate ABS of a slider.

At 420, a change in resistance of a second RTD is detected in response to a change in temperature of the second RTD. The second RTD is not required to be located proximate the ABS.

At 430, a fly-height of the slider is determined based on difference from the change of resistance of the first RTD and the change of resistance of the second RTD.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive (HDD) comprising:
   a first resistive temperature detector (RTD) configured to detect a temperature generated by proximity of a slider and a media, wherein said first RTD is proximate an air bearing surface (ABS) of said slider;
a second RTD configured to detect at least one temperature correlated to a heating of said slider, wherein said second RTD is not required to be proximate said ABS of said slider, and
a read/write integrated circuit (IC) configured to determine an origin of an external heat source and cancel said external heat source to measure temperature changes with an origin proximate to said ABS and further configured to determine said fly-height of said slider based on detection of temperatures by said first RTD and said second RTD.

2. The HDD of claim 1, wherein said first RTD is further configured to detect a temperature generated by a real-time contact of said first RTD with said media.

3. The HDD of claim 1, wherein said read/write IC is further configured to determine said slider contact with media based on detection of temperatures by said first RTD and said second RTD.

4. The HDD of claim 1, wherein a second RTD configured to detect at least one temperature correlated to a heating of said slider comprises:
a second RTD configured to detect at least one temperature correlated to a heating of said slider, wherein said at least one temperature is selected from a group consisting of: ambient temperature, write transducer temperature, thermal fly-height control (TFC) temperature, or self heating.

5. The HDD of claim 1, comprising:
a first current source for said first RTD; and
a second current source for said second RTD, wherein said first current source and said second current source are matched.

6. The HDD of claim 5, wherein said matching of said first current source and said second current source is calibrated to set an auto-zeroing state.

7. The HDD of claim 1, wherein said second RTD is at least 6 microns from said ABS.

8. A slider in a hard disk drive (HDD), comprising:
a first resistive temperature detector (RTD) configured to detect a temperature generated by slider contact with a media, wherein said first RTD is proximate an air bearing surface (ABS) of a slider; and
a second RTD configured to detect at least one temperature correlated to a fly-height of said slider, wherein said second RTD is not required to be proximate said ABS of said slider and wherein said first RTD and said second RTD are configured to determine an origin of an external heat source and cancel said external heat source to measure temperature changes with an origin proximate to said ABS.

9. The slider of claim 8, wherein said slider contact comprises:
real-time write-element contact.

10. The slider of claim 8, wherein a second RTD configured to detect at least one temperature correlated to a fly-height of said slider comprises:
a second RTD configured to detect at least one temperature correlated to a fly-height of said slider, wherein said at least one temperature is selected from a group consisting of: ambient temperature, write transducer temperature or thermal fly-height control (TFC) temperature.

11. The slider of claim 8, wherein said second RTD is not required to be proximate said ABS and not required to comprise significant temperature effects of said ABS.

12. A method for fly-height management in a hard disk drive (HDD), said method comprising:
detecting a change in resistance of a first resistive temperature detector (RTD) in response to a change of temperature of said first RTD generated by slider fly-height changes over a media, wherein said first RTD is proximate an air bearing surface (ABS) of a slider;
detecting a change in resistance of a second RTD in response to a change in temperature of said second RTD, wherein said second RTD is not required to be proximate said ABS;
determining an origin of an external heat source and canceling said external heat source to measure temperature changes with an origin proximate to said ABS; and
determining a fly-height of said slider based on said change of resistance of said first RTD and said change of resistance of said second RTD.

13. The method of claim 12, wherein said determining a fly-height comprises:
determining a fly-height at a read/write integrated circuit.

14. The method of claim 12, wherein detecting a change in resistance of a first resistive temperature detector (RTD) in response to a change of temperature of said first RTD generated by slider fly-height changes over a media, comprises:
detecting a real-time first RTD contact with a media.

15. The method of claim 12, wherein detecting a change in resistance of a second RTD in response to a change in temperature of said second RTD, comprises:
detecting a change in resistance of a second RTD in response to a change in temperature of said RTD, wherein said change in temperature is in response to a group consisting of: ambient temperature, write transducer temperature, thermal fly-height control (TFC) temperature, or self heating.

16. The method of claim 12, wherein said determining a fly-height of said slider comprises:
determining a real-time write-element fly-height.

17. The method of claim 12, comprising
connecting said first RTD and said second RTD at ground.

18. The method of claim 12, comprising:
connecting said first RTD to a first current source; and
connecting said second RTD to a second current source.

19. The method of claim 18, comprising:
matching said first current source and said second current source.

20. The method of claim 19, wherein said matching comprises:
auto zeroing calibration.

* * * * *

UNITED STATES PATENT AND TRADEMARK OFFICE
CERTIFICATE OF CORRECTION

PATENT NO.        : 8,098,450 B2                           Page 1 of 1
APPLICATION NO.   : 12/651161
DATED             : January 17, 2012
INVENTOR(S)       : Peter M. Baumgart et al.

It is certified that error appears in the above-identified patent and that said Letters Patent is hereby corrected as shown below:

Title page, col. 2, under OTHER PUBLICATIONS: Delete, "Gatzen, et al., "Thermo-Resistive Flight Attitude Measurements of Flying Heads in Near-Field Magnetooptical Date Storage", IEEE Transactions on Magnetics, vol. 41, No. 10, (Oct. 2005),2863-2865."

Insert, "Gatzen, et al., "Thermo-Resistive Flight Attitude Measurements of Flying Heads in Near-Field Magnetooptical Data Storage", IEEE Transactions on Magnetics, vol. 41, No. 10, (Oct. 2005), 2863-2865."

Signed and Sealed this
Third Day of July, 2012

David J. Kappos
*Director of the United States Patent and Trademark Office*